April 7, 1953  E. J. CAPSTACK ET AL  2,633,972
CHECK WEIGHER
Filed Dec. 2, 1949  3 Sheets-Sheet 1
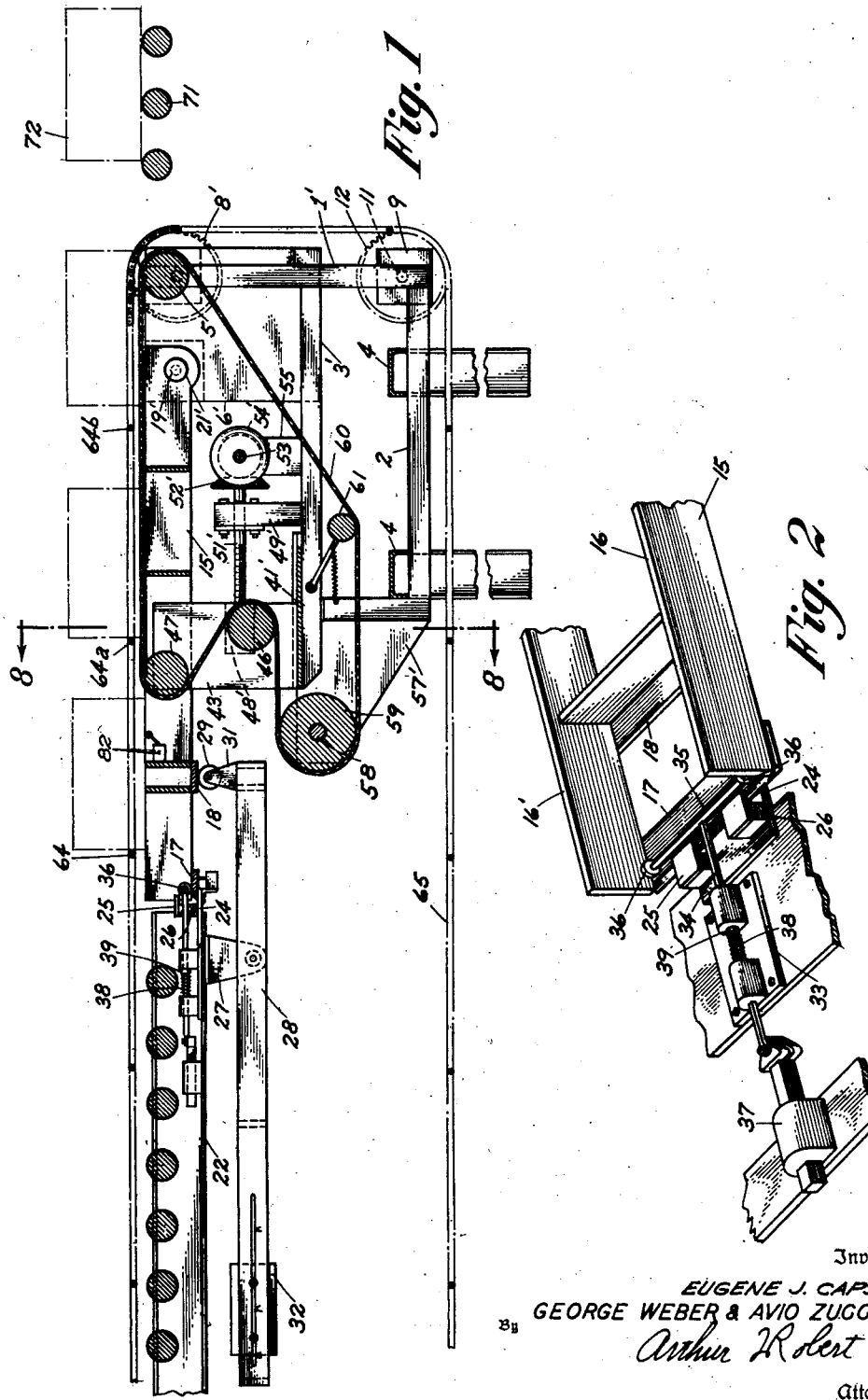
Inventor
EUGENE J. CAPSTACK,
GEORGE WEBER & AVIO ZUCCARINI
By Arthur R. Robert
Attorney April 7, 1953     E. J. CAPSTACK ET AL     2,633,972
CHECK WEIGHER
Filed Dec. 2, 1949     3 Sheets-Sheet 2
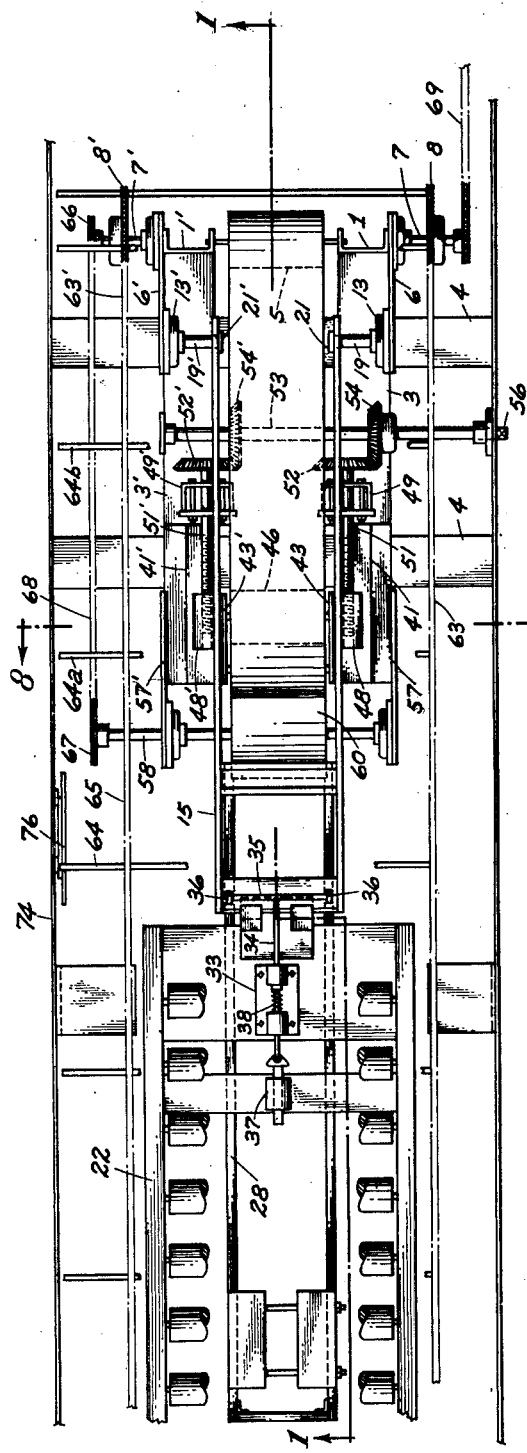
Inventor
EUGENE J. CAPSTACK,
GEORGE WEBER & AVIO ZUCCARINI
By Arthur Robert
Attorney April 7, 1953  E. J. CAPSTACK ET AL  2,633,972
CHECK WEIGHER
Filed Dec. 2, 1949  3 Sheets-Sheet 3
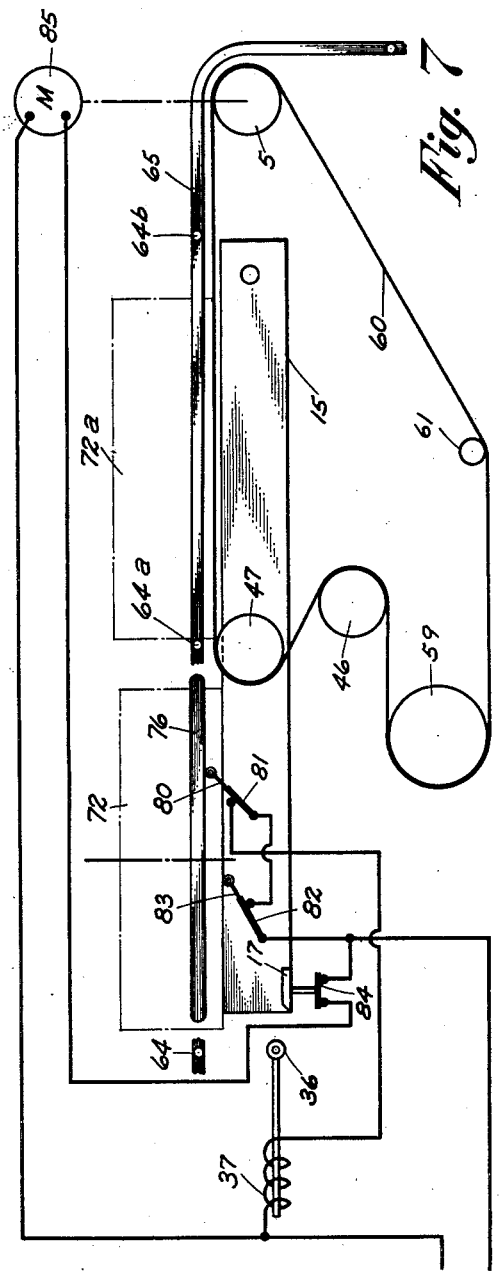
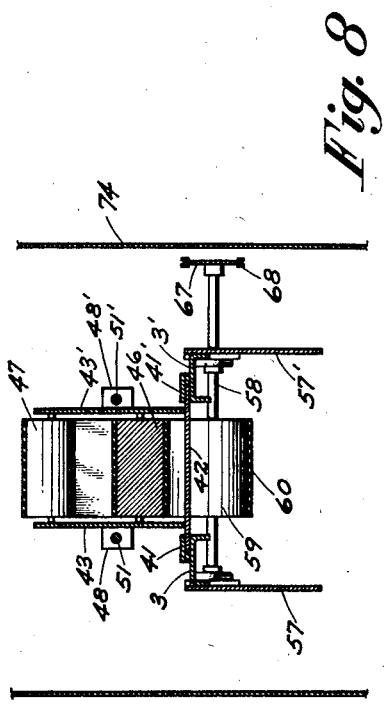
Inventor
EUGENE J. CAPSTACK,
GEORGE WEBER & AVIO ZUCCARINI
Arthur Robert
Attorney Patented Apr. 7, 1953

2,633,972

UNITED STATES PATENT OFFICE 2,633,972

CHECK WEIGHER

Eugene J. Capstack, George Weber, and Avio Zuccarini, Louisville, Ky., assignors to Joseph E. Seagram & Sons, Inc., Shively, Ky., a corporation of Indiana Application December 2, 1949, Serial No. 130,757

13 Claims. (Cl. 198—39)

This invention relates to an automatic weighing apparatus; and relates in particular to such an apparatus for determining whether an article is underweight. The invention finds particular application in the packing of whiskey to determine whether a case of whiskey is short by one or more bottles, but its use is not limited thereto.

Whiskey ordinarily is packaged in bottles containing a fifth of a gallon, a pint, or a half pint, and sometimes quart bottles are used. These bottles are packaged in cartons, twenty-four to a carton. Whiskey manufacturers, when encountering complaints that cases of whiskey are short one or more bottles, are unable to check the source of the shortage to determine whether it is due to errors in the packaging machines, or arises from other causes. Attempts to determine shortage in a sealed carton of bottles before it leaves the plant is complicated by a number of variables involved. Cartons filled with whiskey bottles will vary in size and weight, depending on the size of bottle contained therein, and there will be also a weight variation due to the difference in the quantity of cardboard employed to make the different size cartons. A further difference in weight will be due to variations in weight of the empty bottles. This latter may vary as much as one half to one pound per case for the different size cases. For example, a half pint of whiskey weighs less than a half pound, and thus its weight is within the variation in weight encountered in a normal filled carton.

It is an object of the present invention to provide an automatic weighing apparatus which can be inserted in a line conveyor to determine automatically whether an article is under weight.

A further object is the provision of an automatic weighing apparatus which is adjustable for receiving different sizes and weights of packages.

Another object is the provision of an automatic weighing apparatus which can be easily and quickly compensated for variations in weight of the packaging material, without changing the counterweight adjustment.

Another object is the provision of an intermittent weighing mechanism cooperating with a continuous article feeding means for weighing the articles to determine whether they are overweight or underweight.

According to the present invention the weighing of a carton to determine shortages is made by means of a scale beam having a variable leverage and provided with a counterpoise which is calibrated for the weights of the different size packages. The counterpoise is set for a specified size and weight of carton, and compensation is made for variations in weight of properly filled cartons by changing the leverage of the scale beam until a degree of accuracy in weighing is attained that will result in unbalance of the scale to detect a case containing an empty bottle, or which is short one or more bottles, and which will not be unbalanced by a properly filled carton. The change in leverage preferably is accomplished by varying the position at which the carton is deposited on the scale beam. This may be accomplished by an endless conveyor which has an operating flight adjustable along the length of the balance beam, and in which slackening or lengthening of the conveyor belt or the like is automatically accomplished by the adjustment of the operating flight.

For continuous operation, the scale beam is supplied by a continuous conveyor at intervals with packages to be weighed, and after they are weighed, the packages are carried off the scale by a second superposed continuous conveyor having article engaging means at intervals thereon. By operating the supply conveyor at a greater lineal speed than the superposed conveyor, a time interval is obtained during which the package is deposited on the scale, weighed, and replaced by the next package to be weighed. By means of an interlocking control for the scale cooperating with the superposed conveyor, the scale is locked except for the interval allowed for weighing each package. If a package is of proper weight it is passed on, but if it is underweight the supply conveyor is stopped, or if desired, an ejecting mechanism may be provided, to eject the underweight package. The apparatus may be modified to determine whether an article is overweight by transposing certain parts.

The invention will be described in greater detail in connection with the annexed drawing showing a preferred embodiment of the invention by way of example, and wherein:

Figure 1 is a view partly in vertical section;

Figure 2 is a perspective view of a detail;

Figure 3 is an elevation of a detail;

Figure 4 is an end view as seen from the right of Figure 3 with part in section;

Figure 5 is an obverse view of Figure 3;

Figure 6 is a plan view of Figure 1 with parts broken away;

Figure 7 is a schematic view illustrating the operating principle; and

Figure 8 is a section taken on line 8—8 of Figure 6.

Referring to the drawing (Figures 1 and 6), the apparatus comprises a frame consisting of vertical channel columns 1, 1' at one end; bottom longitudinal channel beams 2, 2, and top longitudinal channel beams 3, 3', each secured at one end to the vertical columns; and transverse channel beams 4, secured to the bottom longitudinal beams. An idler roller 5 is suitably journaled between columns 1, 1'. Plates 6, 6' are secured to pairs of columns and top beams 1, 3 and 1', 3' respectively, and carry bearings in which are journaled shafts 7, 7' carrying idler sprocket 8, 8' exterior of the columns. Plates 9 secured to the bottom beams 2 and end columns 1, 1' each carry a shaft 11 upon which are mounted sprocket wheels 12. Plates 6, 6' also carry bearings 13, 13'. A scale beam 15 is made up of horizontal side bars 16, 16' united at the bottom by transverse bracing plates or rails 17, 18, etc. Stub shafts 19, 19' having securing flanges 21, 21' thereon pass through apertures in the bars 16, 16' and are journaled in the bearings 13, 13'. The flanges are secured to the side bars of the scale beam in any suitable manner. A conveyor frame 22 has a stop plate 24 extending below scale beam 15 to limit counterclockwise movement of the beam so as to hold the beam horizontal, and a stop 25 is secured to plate 24 by a spacer 26 to limit clockwise movement of the beam.

Brackets 27 pivotally support a counterpoise beam 28 from the conveyor frame 22. The counterpoise beam carries a bearing roller 29 in a suitable bracket 31 at its end, and this roller engages the bottom of the transverse rail 18 on the scale beam. Weights 32 at the other end of the counterpoise bias the roller 29 against rail 18, and thus bias the scale beam clockwise against the upper stop 25. A bearing plate 33 (Fig. 2) on the conveyor frame 22 slidably receives a rod 34 carrying a transverse rod 35 at one end upon which are journalled rollers 36. A solenoid 37 on conveyor frame 22 has its core coupled to rod 34. Rollers 36 are extended into engagement with the plate 17 on the scale beam by a spring 38 engaging a collar 39 on rod 34, and they hold the beam against stop plate 24. Upon retraction of rod 34 by energization of the solenoid, the rollers are disengaged from the plate 17 to allow the end of the scale beam to rise by reason of the bias of weights 32. These weights are adjustable lengthwise of the counterpoise beam in any suitable manner to vary the biasing force.

The top channel beams 3, 3' carry guides 41, 41' (Fig. 8) which slidably receive a cross plate 42 therebetween. Plate 42 carries vertical bearing plates 43, 43' spaced apart less than the width of the scale beam and suitably braced. A lower roller 46 and an upper roller 47 are journaled therein between the plates, roller 47 being substantially in a horizontal plane with roller 5 (Fig. 1). Plates 43, 43' carry nuts 48, 48' at their sides. A pair of bearing members 49, 49' (Fig. 1) have screw threaded horizontal rods 51, 51' journaled therein, the ends of the rods being threaded into nuts 48, 48', so that rotation of the rods moves the plates 43, 43' and rollers 46, 47 carried thereby horizontally as a unit. The rods have miter gears 52, 52' (Fig. 6) secured at their opposite ends. A transverse shaft 53 carrying meshing miter gears 54, 54' is journaled in posts 55 (Fig. 1) secured to beams 3. The end of this shaft is noncircular as indicated at 56 to receive a key or crank for turning the shaft for positioning rolls 46, 47.

Bearing plates 57, 57' (Figs. 6 and 8) journal a shaft 58 upon which is mounted a driving roller 59. A conveyor belt 60 extends around rollers 5, 47, 46 and driven roller 59 and under an adjustably mounted roller 61 on the frame which adjusts the tension of the belt. Each pair of sprockets 8, 11 and 8', 11 (Figs. 1 and 6) carry chains 63, 63', and spaced flight bars 64, 64a, 64b, etc., joining the chains provide a conveyor indicated generally by the numeral 65. The conveyor 65 is driven in any suitable manner. Through sprocket 66 on shaft 7' and sprocket 67 on shaft 58, chain 68 drives the power roller 49 of the belt conveyor 60. It will be noted that the belt conveyor 60 is driven at a greater lineal speed than conveyor 65, by a suitable drive ratio. Packages to be weighed are brought to the weighing mechanism by any suitable conveyor 71 (Fig. 1), here shown as a power driven roller conveyor, driven from conveyor 65 through chain 69.

The mechanism so far described, operates as follows: a package or carton 72 to be weighed is brought by conveyor 71 and is deposited on the belt conveyor 60 which extends slightly above scale beam 15. As conveyor 60 moves faster than conveyor 65, the package is advanced into engagement with a forward flight bar 64 by the time the package is discharged at the left end by roller 47 onto the scale beam 15. The position of roll 47 determines the position at which the package will be deposited on the scale beam. Normally this roll is adjusted, by means of the threaded rods 51, 51' and cross shaft 53, to discharge the package onto the scale beam with its middle substantially vertically over the axis of the bearing roller 29. Adjustments for normal variations in weight of packaging materials, or in size of packages are made by adjusting the position at which the package is deposited on the scale beam to thereby vary the effective lever length of the scale and the apparent weight of the package. When the package transfers to the scale beam its forward motion stops, and the rear flight bar 64a thereafter overtakes and engages the rear edge of the package and pushes the package off the scale onto the conveyor 22. In the meantime another package on conveyor 60 is brought into engagement with the opposite side of the flight bar 64a in readiness to be deposited on the scale beam. During the interval that the first package comes to rest on the scale beam and is carried off by the flight bar 64a the package is weighed, and the next package is being deposited while the first package is being removed.

The time delay mechanism for carrying out the weighing operation now will be described. Referring to Figures 3 to 5, the housing 74 has a pair of links 75, 75' swiveled to a switch operating bar 76. An expansion spring 77 secured between the housing and the link 75 biases the links to hold the switch bar elevated, and a stop 78 may be provided to limit upward movement of the bar. A switch housing 79 secured to the scale housing has a pivoted switch arm 80 which is biased upwardly against operating bar 76, so that when the operating bar is depressed the switch in housing 79 is opened. The operating bar 76 is engaged and depressed by the flight bars 64, 64a, 64b, etc. which extend at one side for this purpose, as shown in Figure 6. Referring to Figure 7, it will be seen that switch 81 (located in housing 79) is in series with a switch 82 and the solenoid 37. Switch 82 has an operating arm 83 extending above the top of the balance beam 15, and is located so that when a package is deposited on the scale beam, the bottom of the package engages and depresses arm 83, thus closing switch 82. Conversely, upon removal of the package switch 82 opens. A switch 84 suitably secured to the balance beam controls the motor 85 that drives the conveyors 60 and 65, so that raising of the balance beam opens this switch and stops the conveyors.

To adjust the apparatus for testing a case of half pints, the weight 32 is moved to the left to register with the half pint calibration, and a filled case is placed on the scale beam with the middle of the case over the center of bearing roller 29. The switch operating bar 76 now is adjusted in length so that the end $a$ is set far enough ahead of the case to allow the case to come to rest before the flight bar 64 that is ahead of the case disengages therefrom, and the end $b$ is set far enough behind the case so that the flight bar 64a following the case trips the switch operating bar before it engages the case. The belt roller 47 now is adjusted to where the belt 60 barely touches the case.

The adjustment may be tested by placing a properly filled case on the conveyor 60 and depositing the case thereby on the scale beam. If the case unbalances the scale so as to operate the stop mechanism, the belt roller is moved forwardly slightly (to the left as seen in Fig. 3) and another test made until the case passes off of the scale without unbalancing the beam enough to operate the stop mechanism. Next, the apparatus is tested by placing a case having one bottle removed on conveyor 60, and the roller is adjusted to the point where such a case will unbalance the scale enough to operate the stop mechanism. The apparatus is now set for operation.

During operation, if the case deposited on the scale beam is not light, the apparatus operates as follows: Referring to Fig. 7, the case 72 is deposited on the scale beam 15 by the conveyor 60, and closes switch 82, flight bar 64 being still in engagement with switch operating bar 76 to hold switch 81 open. A short time thereafter flight bar 64 rides off the end of switch operating bar 76 to close switch 81, and complete the circuit of solenoid 37 which thereupon retracts hold-down rollers 36. If the case is light, the scale beam rises to open switch 84 and open the operating circuit of motor 85 to stop the conveyors. This requires that the attendant investigate the cause of the stoppage, remove the light weight case or correct the shortage in the case and start the apparatus.

If the case is not light weight, the approaching flight bar 64a engages the end $b$ of the switch operating bar to depress the bar and open switch 81, thereby deenergizing solenoid 37, and spring 38 restores the rollers 36' to hold-down position. Flight bar 64a now engages case 72 to push it off the scale beam, and at the same time case 72a is being brought onto the scale beam by conveyor 60. In leaving the scale beam the case 72 disengages and opens switch 82 (without any effect on the solenoid as switch 81 is being held open by flight bar 64a). Case 72a advances to the position to close switch 82 and when flight bar 64a leaves the end $a$ of bar 76, the solenoid 37 is deenergized to repeat the weighing operation.

For testing cases of pints the weight is moved to the pint calibration, and the apparatus is adjusted as above described to pass full cases and reject an improperly filled case. In a similar manner the apparatus may be set up to test cases of quarts or fifths gallon.

It will be noted that the space between the flight bars is greater than the longest case to be weighed, so that the difference between the length of the case and the flight bar spacing determines the weighing time. Obviously, small cases will be given a longer weighing time. By adjusting roller 47 the proper distance from the weight axis of the scale beam (shown by a dot and dash line) the case will be deposited on the scale beam in such position as to compensate for normal variations in weight of a case. By having roller 46 move as a unit with roller 47 the increase or decrease in length of the top flight of conveyor 60 does not change the belt tension. The belt between rollers 47, 46 and rollers 46, 59 serves as a reserve to automatically take up or supply belt length for the changes in the top flight.

Various changes may be made in the invention without departing from the spirit or scope thereof.

We claim as our invention:

1. In combination: a weighing scale having a weighing beam; a belt conveyor having a roller at the discharge end for depositing an article to be weighed on the beam; means for adjusting said roller lengthwise of the beam; a superposed open work conveyor having article engaging means; means for operating the superposed conveyor at a lesser lineal speed than the belt conveyor; means for locking the beam; and means operated by the superposed conveyor and an article on the beam for releasing said locking means.

2. An apparatus as specified in claim 1 wherein said means for adjusting the roller includes a second roller offset relative to the first roller to provide a reserve belt.

3. In combination: a weighing scale; a belt conveyor for depositing articles on the scale to be weighed; a superposed conveyor providing a series of spaced article engaging means whereby an article on the belt conveyor lies between successive article engaging means; means for operating the belt conveyor at a greater lineal speed than the superposed conveyor whereby the forward end of an article to be weighed is pressed against a forward article engaging means, electromechanical means having an operating circuit for locking the scale; switch means on the scale in said operating circuit positioned to be operated by the deposit of an article on the scale to be weighed, and a second switch means in said operating circuit positioned to be operated by a rearward article engaging means, whereby said scale is unlocked for weighing an article deposited thereon and is locked during replacement of the article.

4. An apparatus as specified in claim 3 having a switch operating bar located adjacent said weighing scale to be operated by an article engaging means for operating said second switch.

5. An apparatus as specified in claim 4 wherein said bar is adjustable to time engagement and disengagement thereof by an article engaging means.

6. In combination: a weighing scale having a weighing beam; a counterpoise beam in alignment therewith to move the weighing beam upward; means locking the weighing beam against upward movement; a belt conveyor extending along the weighing beam for depositing articles to be weighed on the beam; an overrunning flight conveyor operating at a lesser speed than the belt conveyor for removing articles from the scale beam; and means operated by deposit of articles on the scale beam and by the flight conveyor for releasing said locking means.

7. In combination: a frame; a weighing scale having a counterpoised weighing beam with an opening adjacent one end; a roller on said frame positioned in said opening; an endless conveyor passing over said roller to deposit an article on said weighing beam; and means to adjust said roller lengthwise of the weighing beam to position articles discharged therefrom on the weighing beam.

8. In combination: a frame; a weighing scale having a counterpoised weighing beam with an opening adjacent one end; a roller on said frame positioned in said opening; a second roller; an endless conveyor passing over said rollers to deposit an article on said weighing beam; a third roller between said first and second rollers out of alignment therewith; and means to simultaneously adjust said first and third rollers lengthwise of the weighing beam to position articles discharged therefrom on the weighing beam, the movement of the third roller automatically maintaining the belt tension.

9. In combination: a platform for receiving articles to be weighed pivoted adjacent one end; a pivoted counterpoise beam engaging the weighing platform and biasing the platform in one direction; detent means for preventing movement of the platform; an endless conveyor for depositing articles to be weighed on said platform; an electrical circuit for releasing said detent comprising a normally open switch located to be closed by an article on said platform, and a normally closed delaying switch in series with the first switch; an endless conveyor for removing weighed articles from said platform; and switch operating means cooperating with the latter conveyor to maintain said delaying switch open during positioning and removal of an article on the platform.

10. An apparatus as specified in claim 9 wherein said latter conveyor carries spaced operating members; and the switch operating means comprises a depressible bar adapted to be engaged successively by said operating members.

11. The apparatus specified in claim 10 wherein the length of the bar is adjustable to change the time of operation of the delaying switch.

12. In combination: a scale having a weighing platform to receive articles to be weighed; a belt conveyor adjacent said platform for depositing an article to be weighed on said platform; detent means for holding said platform against movement; a second endless openwork conveyor passing over said platform; a detent releasing circuit including a normally open switch located to be closed by an article deposited on said platform and a second normally closed switch; spaced switch operators carried by said second conveyor; and timing means for the second switch for cooperation with said switch operators to alternately open and close the second switch to release said detent when both switches are closed to provide a weighing interval.

13. An apparatus as specified in claim 12 wherein said second conveyor is superposed on the first conveyor and is operated at a lesser speed.

EUGENE J. CAPSTACK.
GEORGE WEBER.
AVIO ZUCCARINI.

REFERENCES CITED

The following references are of record in the file of this patent:

UNITED STATES PATENTS

| Number | Name | Date |
|---|---|---|
| 1,366,449 | Hallock | Jan. 25, 1921 |
| 1,669,613 | Greer | May 15, 1928 |
| 1,892,627 | Pearson | Dec. 27, 1932 |
| 1,994,550 | Watson | Mar. 19, 1935 |
| 2,067,744 | Williams | Jan. 12, 1937 |
| 2,074,595 | Shackelford | Mar. 23, 1937 |
| 2,099,893 | Jones | Nov. 23, 1937 |
| 2,246,582 | Gantzer | June 24, 1941 |
| 2,261,303 | Smith | Nov. 4, 1941 |
| 2,355,100 | Nordquist | Aug. 8, 1944 |
| 2,359,786 | Pechy | Oct. 10, 1944 |
| 2,455,175 | Hohl | Nov. 30, 1948 |
| 2,521,877 | Cheeseman | Sept. 12, 1950 |